US008593748B1

(12) United States Patent
Bandic et al.

(10) Patent No.: US 8,593,748 B1
(45) Date of Patent: Nov. 26, 2013

(54) SHINGLED MAGNETIC RECORDING DISK DRIVE WITH COMPENSATION FOR THE EFFECT OF FAR TRACK ERASURE (FTE) ON ADJACENT DATA BANDS (75) Inventors: Zvonimir Z. Bandic, San Jose, CA (US); Damien Cyril Daniel Le Moal, Machida (JP); Shad Henry Thorstenson, Rochester, MN (US)

(73) Assignee: HGST Netherlands B.V., Amsterdam (NL)

( * ) Notice: Subject to any disclaimer, the term of this patent is extended or adjusted under 35 U.S.C. 154(b) by 8 days.

(21) Appl. No.: 13/487,310

(22) Filed: Jun. 4, 2012

(51) Int. Cl.
*G11B 27/36* (2006.01)
*G11B 5/09* (2006.01)
*G11B 19/04* (2006.01)

(52) U.S. Cl.
USPC .................. 360/31; 360/48; 360/60; 711/112

(58) Field of Classification Search
None
See application file for complete search history.

(56) References Cited

U.S. PATENT DOCUMENTS

| | | | |
|---|---|---|---|
| 5,600,500 A | 2/1997 | Madsen et al. | |
| 6,185,063 B1 | 2/2001 | Cameron | |
| 6,442,705 B1 | 8/2002 | Lamberts et al | |
| 6,947,234 B2 | 9/2005 | Lamberts et al. | |
| 6,967,810 B2 | 11/2005 | Kasiraj et al. | |
| 7,227,708 B2 | 6/2007 | Feng | |
| 7,567,400 B2 | 7/2009 | Cheng | |
| 8,385,162 B2 * | 2/2013 | Rosen et al. | 369/13.33 |
| 2006/0066971 A1 | 3/2006 | Alex et al. | |
| 2009/0091861 A1 | 4/2009 | Takano et al. | |
| 2009/0244775 A1 | 10/2009 | Ehrlich | |
| 2010/0232057 A1 * | 9/2010 | Sanvido et al. | 360/78.04 |
| 2013/0148225 A1 * | 6/2013 | Coker et al. | 360/31 |

OTHER PUBLICATIONS

D. Guarisco et al., "A Fast and Accurate Method for Measuring Adjacent-Track Erasure", IEEE Transactions on Magnetics, vol. 42, No. 12, Dec. 2006, pp. 3868-3873.
Li et al, "Adjacent Track Erasure Analysis and Modeling at High Track Density", IEEE Transactions on Magnetics, vol. 39, No. 5, Sep. 2003, pp. 2627-2629.
Y. Liu et al., "Characterization of Skip or Far Track Erasure in a Side Shield Design", IEEE Transactions on Magnetics, vol. 45, No. 10, Oct. 2009, pp. 3660-3663.

* cited by examiner

*Primary Examiner* — Andrew L Sniezek
(74) *Attorney, Agent, or Firm* — Thomas R. Berthold (57) ABSTRACT

A shingled magnetic recording (SMR) disk drive has concentric shingled data tracks having data sectors with physical block addresses (PBAs), with the tracks being arranged in annular bands separated by annular inter-band gaps. The disk drive also has an on-disk extended cache region and may have writable inter-band cache (IBC) tracks in the inter-band gaps. A count is maintained in memory for each band and each IBC, and the count is incremented for each writing to a band or an IBC. When a count for a band or IBC reaches a predetermined threshold, the data is read from the tracks in the boundary region of the adjacent band that are within the range of the FTE and that data is then written to the extended cache. The FTE-affected tracks are then invalidated, meaning that PBAs can no longer be assigned to the data sectors in those tracks.

19 Claims, 6 Drawing Sheets

SHINGLED MAGNETIC RECORDING DISK DRIVE WITH COMPENSATION FOR THE EFFECT OF FAR TRACK ERASURE (FTE) ON ADJACENT DATA BANDS

BACKGROUND OF THE INVENTION

1. Field of the Invention

This invention relates generally to magnetic recording hard disk drives (HDDs), and more particularly to a shingled magnetic recording (SMR) HDD that compensates for the effect of far track erasure (FTE) on data tracks in the boundary regions of data bands.

2. Description of the Related Art

Magnetic recording disk drives that use "shingle writing", also called "shingled recording" or "shingled magnetic recording" (SMR), have been proposed, for example as described in U.S. Pat. No. 6,185,063 B1 and U.S. Pat. No. 6,967,810 B2. In SMR, the write head, which is wider than the read head in the cross-track direction, writes magnetic transitions by making a plurality of consecutive circular paths that partially overlap. The non-overlapped portions of adjacent paths form the shingled data tracks, which are thus narrower than the width of the write head. The data is read back by the narrower read head. The narrower shingled data tracks thus allow for increased data density. The shingled data tracks are arranged on the disk as annular bands separated by annular inter-band gaps or guard bands.

The writing of data to an entire band may occur when new data from the host is stored in memory and then written to a band for the first time. It may also occur when a portion of the data in a band is modified, i.e., a "read-modify-write" operation in which all the corresponding data in a band is read and stored in memory, then a portion is modified with the host-provided new write data, and finally all the corresponding data is written data back to the band. The writing of data to an entire band or bands may also occur when a band or bands are "cleaned" or "de-fragmented" to reclaim free space, i.e., the data in one or more bands is read and stored in memory and then re-written to the same band or a new band.

A problem in both conventional HDDs and SMR HDDs is wide-area track erasure (WATER) or far track encroachment or erasure (FTE). The write field from the write head is wider than a data track so when the write head is writing to a track, the outer portions of the write field (called the fringe field) overlap onto tracks other than the track being written. Data degradation due to fringe fields is not limited to the tracks immediately adjacent the track being written, but can extend over a range of tracks relatively far from the track being written. This FTE is particularly noticeable with write heads that have side shields. FTE may not affect tracks symmetrically on both sides of the track being written. Tracks on one side may encounter more pronounced FTE effects due to the write head shield design or due to read-write head skew. FTE is described by Liu et al., "Characterization of Skip or Far Track Erasure in a Side Shield Design", *IEEE TRANSACTIONS ON MAGNETICS*, VOL. 45, NO. 10, OCTOBER 2009, pp. 3660-3663.

In a SMR disk drive, FTE can occur on the tracks in the boundary region of a band, i.e., those tracks near an inter-band gap, when data is written to tracks in the boundary region of an adjacent band. In U.S. application Ser. Nos. 13/423,177 and 13/423,178, both filed Mar. 17, 2012 and assigned to the same assignee as this invention, a counter is maintained for each data band and when data is written to the boundary region of a band or to an on-disk cache located between two data bands, the counters associated with adjacent bands are incremented by a value related to the previously determined FTE effect. When the count for a band reaches a predetermined threshold, the data in that band is rewritten. The data is rewritten before the FTE effects can build up, so the reliability of the data is improved.

What is needed is a SMR HDD that compensates for the FTE effect on adjacent bands without the need to continually read data from and rewrite data to bands affected by FTE.

SUMMARY OF THE INVENTION

The invention relates to a SMR HDD that essentially eliminates the effect of far track erasure (FTE) in the boundary regions of annular data bands caused by writing in the boundary regions of adjacent data bands, but without the need to continually read data from and rewrite data to bands affected by the FTE. The SMR disk has concentric shingled data tracks having data sectors with physical block addresses (PBAs), with the tracks being arranged in annular bands separated by annular inter-band gaps. The disk drive also has an extended cache region which is a plurality of concentric data tracks separated from the data bands, and at least some of the inter-band gaps may also have writable inter-band cache (IBC) tracks. A count is maintained in memory for each band and each IBC, and the count is incremented for each writing to a band or an IBC. When a count for a band or IBC reaches a predetermined threshold, such as a predetermined number within a predetermined time period, the data is read from the tracks in the boundary region of the adjacent band that are within the range of the FTE and that data is then written to the extended cache. The FTE-affected tracks are then invalidated, meaning that PBAs can no longer be assigned to the data sectors in those tracks.

For a fuller understanding of the nature and advantages of the present invention, reference should be made to the following detailed description taken together with the accompanying figures.

DETAILED DESCRIPTION OF THE INVENTION

Figure 1:
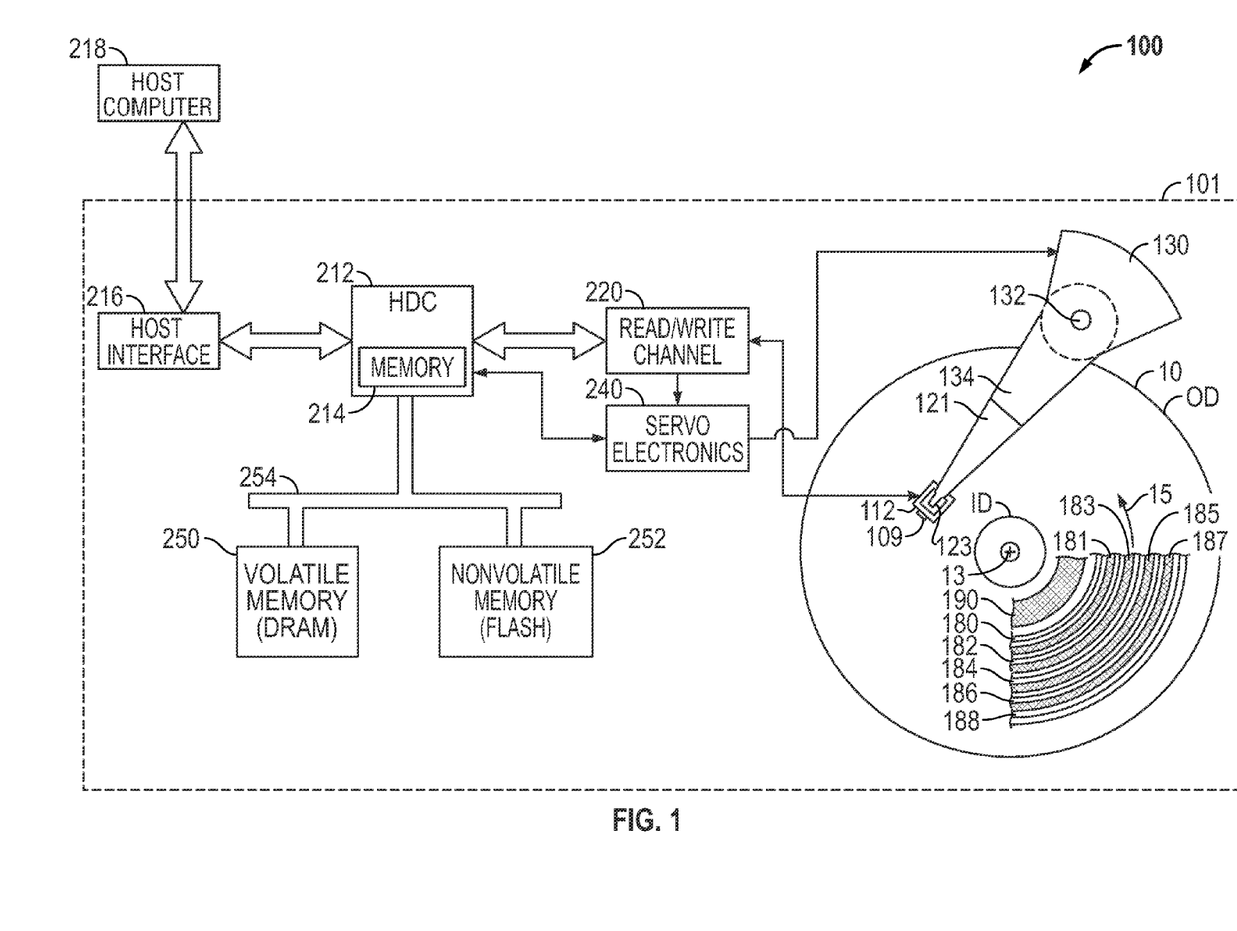
FIG. 1 is a top view of a SMR disk drive for use with the method according to the invention.

FIG. 1 is a top view of a disk drive 100 with shingled recording according to the invention. The disk drive has a housing or base 101 that supports an actuator 130 and a spindle motor (not shown) for rotating the magnetic recording disk 10 about its center 13 in the direction indicated by arrow 15. The actuator 130 may be a voice coil motor (VCM) rotary actuator that has a rigid arm 134 and rotates about pivot 132. A head-suspension assembly includes a suspension 121 that has one end attached to the end of actuator arm 134, a flexure 123 attached to the other end of suspension 121, and a head carrier, such as an air-bearing slider 122, attached to the flexure 123. The suspension 121 permits the slider 122 to be maintained very close to the surface of disk 10 and the flexure 123 enables the slider 122 to "pitch" and "roll" on an air-bearing generated by the rotating disk 10. The slider 122 supports the read/write or recording head 109 located on the end face 112 of slider 122. The recording head 109 is typically a combination of an inductive write head with a magnetoresistive read head (also called a read/write head). Only one disk surface with associated slider and recording head is shown in FIG. 1, but there are typically multiple disks stacked on a hub that is rotated by a spindle motor, with a separate slider and recording head associated with each surface of each disk.

In this invention the disk drive uses shingled magnetic recording (SMR), also called shingled writing. Thus FIG. 1 also illustrates portions of the circular shingled data tracks grouped as annular regions or bands on the recording layer of disk 10. Only portions of five bands 180, 182, 184, 186 and 188 are depicted, but there would typically be a large number of bands. Adjacent bands are separated by inter-band annular gaps, such as typical gaps 181, 183, 185 and 187. For example, for a 2.5 inch disk drive with shingled recording, the shingled data tracks may have a cross-track width (TW) of about 50 nm with each band containing several hundred tracks and with each gap separation between the bands being about 100 nm (or about 2 TW). In shingled recording the write head, which is wider than the read head in the cross-track direction, writes magnetic transitions by making a plurality of consecutive circular paths or tracks that partially overlap. The non-overlapped portions of adjacent paths or tracks form the shingled data tracks, which are thus narrower than the width of the write head. The data is read back by the narrower read head. When data is to be re-written in a shingled data track, all of the shingled data tracks that have been written after the track to be re-written are also re-written.

Some of the inter-band gaps may contain writeable tracks that serve as an on-disk inter-band cache (IBC). For example, gaps 185, 187 may contain a group of several, e.g., 2-5, cache tracks with a non-writeable guard track between the IBC and each adjacent data band. FIG. 1 also illustrates a region 190 of disk 10 with data tracks that function as an on-disk extended cache (E-cache). The E-cache is used as staging area for data that will ultimately be written to the data bands and typically contains enough data tracks equal to about 0.5-10.0% of the total capacity of the HDD. The E-cache region 190 is depicted as dedicated tracks near the disk ID, but the region 190 may be located anywhere on the disk 10, for example near a disk mid-diameter.

As is well known in the art, the data in each shingled data track in each of the bands is also divided into a number of contiguous physical data sectors (not shown). Each data sector is preceded by a synchronization (sync) field, which is detectable by the read head for enabling synchronization of reading and writing the data bits in the data sectors. Also, each shingled data track in each of the bands includes a plurality of circumferentially or angularly-spaced servo sectors (not shown) that contain positioning information detectable by the read head for moving the read/write head 109 to the shingled data tracks and maintaining the read/write head 109 on the tracks. The servo sectors in each shingled data track are typically aligned circumferentially with the servo sectors in the other shingled data tracks so that they extend across the shingled data tracks in a generally radial direction.

The disk drive 100 also includes a hard disk controller (HDC) 212 that can include and/or be implemented by a microcontroller or microprocessor. The controller 212 runs a computer program that is stored in memory 214 and that embodies the logic and algorithms described further below. The memory 214 may be separate from controller 212 or as embedded memory on the controller chip. The computer program may also be implemented in microcode or other type of memory accessible to the controller 212. The controller 212 is connected to a host interface 216 that communicates with the host computer 218. The host interface 216 may be any conventional computer-HDD interface, such as Serial ATA (Advanced Technology Attachment) or SAS (Serial Attached SCSI). The electronics associated with disk dive 100 also include servo electronics 240. In the operation of disk drive 100, the read/write channel 220 receives signals from the read head and passes servo information from the servo sectors to servo electronics 240 and data signals from the data sectors to controller 212. Servo electronics 240 typically includes a servo control processor that uses the servo information from the servo sectors to run a control algorithm that produces a control signal. The control signal is converted to a current that drives actuator 130 to position the read/write head 109.

In the operation of disk drive 100, the controller 212 acts as a data controller to transfer blocks of write data from the host computer 218 through the read/write channel 220 for writing to the disk 10 by the write head, and to transfer blocks of read data from the disk 10 back to the host computer 218. Interface 216 receives commands from the host computer 218 for reading or writing blocks of data from or to the data sectors. The host computer 218 uses logical block addresses (LBAs) in commands to read and write blocks of data without regard for actual locations (physical block addresses or PBAs) used internally by the HDD. The controller 212 receives a list of LBAs from interface 216 and translates them into a set of PBAs that uniquely identify the disk surface, track and data sector. The PBAs are passed to servo electronics 240 to enable positioning read/write head 109 to the appropriate data sector.

Disk drives typically include, in addition to the rotating disk storage, solid state memory (referred to as "cache") that temporarily holds data before it is transferred between the host computer and the disk storage. The conventional cache is dynamic random access memory (DRAM), a volatile form of memory that can undergo a significant number of write/erase cycles and that has a high data transfer rate. Disk drives may also include nonvolatile memory. One type of nonvolatile memory is "flash" memory, which stores information in an array of floating gate transistors, called "cells" which can be electrically erased and reprogrammed in blocks. Thus in disk drive 100, the controller 212 also communicates with volatile memory 250 (shown as DRAM) and optional nonvolatile memory 252 (shown as FLASH) via data bus 254.

The SMR disk drive of this invention also includes on-disk cache in the form of IBCs and an E-cache 190. Data is transferred from the DRAM cache 250 and written directly to the E-cache 190 or first to an IBC and then to the E-cache 190. Then, during disk drive idle times, the data is read from the IBC and written to the E-cache 190 and then from the E-cache to the data bands. In an SMR disk drive the PBA of a LBA can change frequently depending on write-history. For example, background processes such as defragmentation of the data bands moves data sectors from one PBA to another but the LBA remains the same. The LBA-PBA mapping can change with every write operation because the controller 212 dynamically determines the physical location on the disk where the host data for an LBA will be written. Thus the PBA for a LBA may change dynamically between an IBC, the E-cache or a data band. The data for the same LBA will be written to a different location the next time the host LBA is updated. The dynamic LBA-PBA mapping system for a SMR disk drive that uses IBCs and an E-cache is described in U.S. application Ser. No. 13/200,418 filed Sep. 22, 2011 and assigned to the same assignee as this application. The '418 application refers to a data band, an IBC and the E-cache as an i-region, a write-twice cache (W2C) and an E-region, respectively, and is hereby incorporated by reference.

Figure 2:
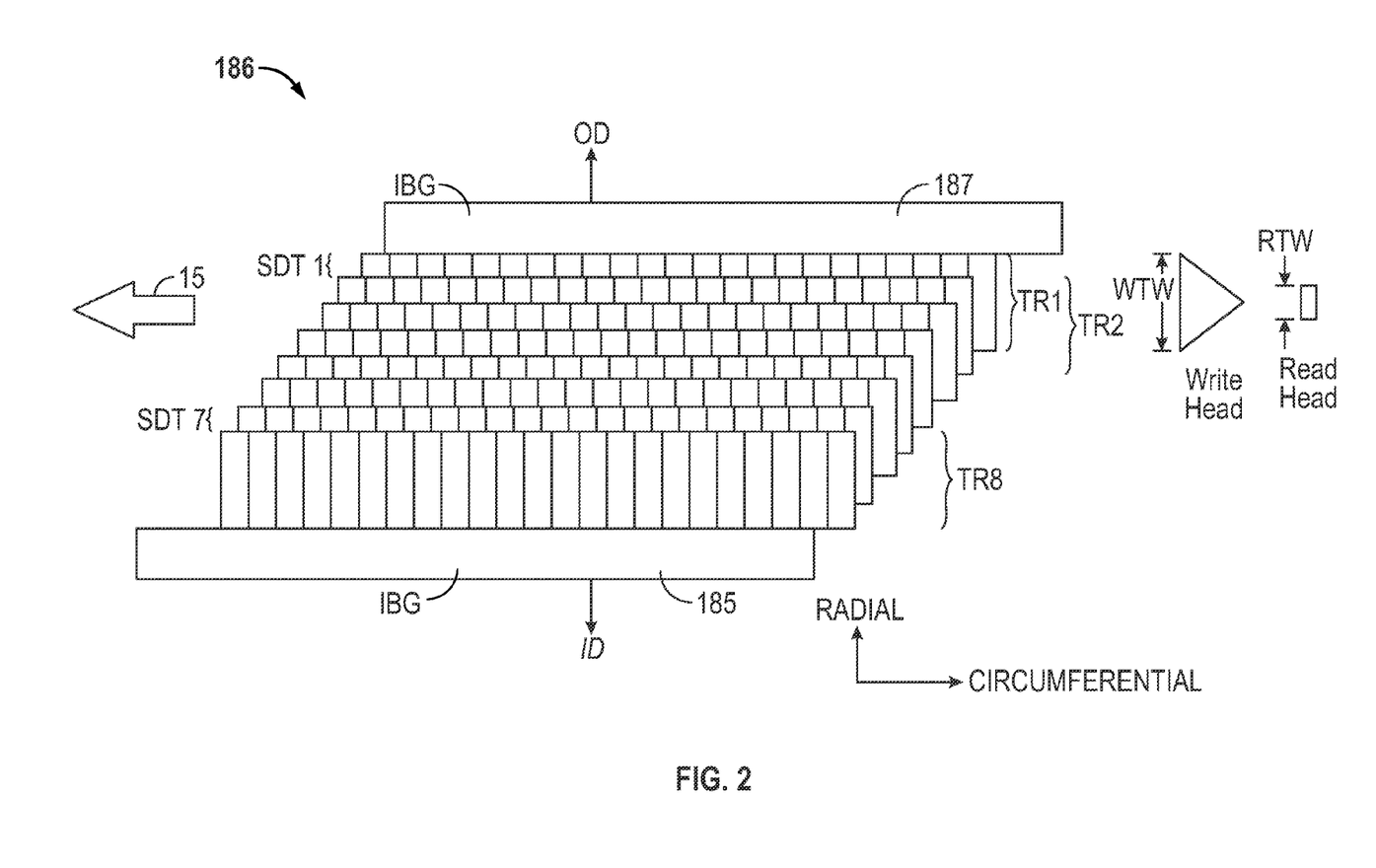
FIG. 2 is a schematic showing a typical band on a SMR disk and illustrates the multiple overlapping tracks that define the shingled data tracks.

FIG. 2 is a schematic of a shingled region or band, like band 186, for use in describing the method of SMR. A typical band will have a large number, i.e., several hundred or thousand, shingled data tracks (SDTs); however only 7 are shown in band 186 for ease of illustration. Band 186 has inter-band gaps (IBGs) 185, 187 that separate it from radially adjacent bands. The write head makes successive paths or tracks (TRs) to form the SDTs which, in the example of FIG. 2, are written in the direction from disk outside diameter (OD) to disk inside diameter (ID). The write pole tip of the write head has a cross-track width (WTW) that is wider than the sensing edge of the read head cross-track width (RTW). When writing data, the write head generates paths of magnetic transitions, represented by the vertical lines, as the recording layer moves in the direction of arrow 15. For example, the actuator positions the write head to write data along track 1 (TR1), then moves the write head to write data along track 2 (TR2). The writing of data along TR2 overwrites a portion of the previously written TR1 and thus "squeezes" the data of TR1 to thereby form the first shingled data track (SDT1). In the example of FIG. 2, the shingled data tracks are written in the direction from the disk OD to ID. However, a disk drive can be formatted such that writing of the shingled data tracks in one or more bands can be from ID to OD, with different bands being written in different directions.

In general, in SMR, whenever any portion of the data in an annular band is to be re-written or updated, all of the shingled data tracks in that annular band that were written after the shingled data track being updated are also re-written. The writing of data to an entire band may occur when new data from the host is stored in memory and then written to a band for the first time. It may also occur when a portion of the data in a band is modified, i.e., a "read-modify-write" operation in which units of data, such as single-track units, are read and stored in memory, then modified and written back to the band. The writing of data to an entire band or bands may also occur when a band or bands are "cleaned" or "de-fragmented" to reclaim free space, i.e., the data in one or more bands is read and stored in memory and then re-written to the same band or a new band.

A problem in both conventional HDDs and SMR HDDs is wide-area track erasure (WATER) or far track encroachment or erasure (FTE). The write field from the write head is wider than a data track so when the write head is writing to a track, the outer portions of the write field (called the fringe field) overlap onto tracks other than the track being written. The fringe fields can extend over a range of tracks relatively far from the track being written. FTE generally translates into an increase in bit error rate (BER), resulting in degradation of the performance of the disk drive. In some severe cases, poor BER will lead to a significant increase of unrecoverable data errors. FTE is particularly noticeable with write heads that have side shields. FTE may not affect tracks symmetrically on both sides of the track being written. Tracks on one side may encounter more pronounced FTE effects due to the write head shield design or due to read-write head skew. In a SMR disk drive, FTE can occur on the tracks in the boundary region of a band, i.e., those tracks near an inter-band gap, when data is written to tracks in the boundary region of an adjacent band and when data is written to tracks in an IBC.

Figure 3:
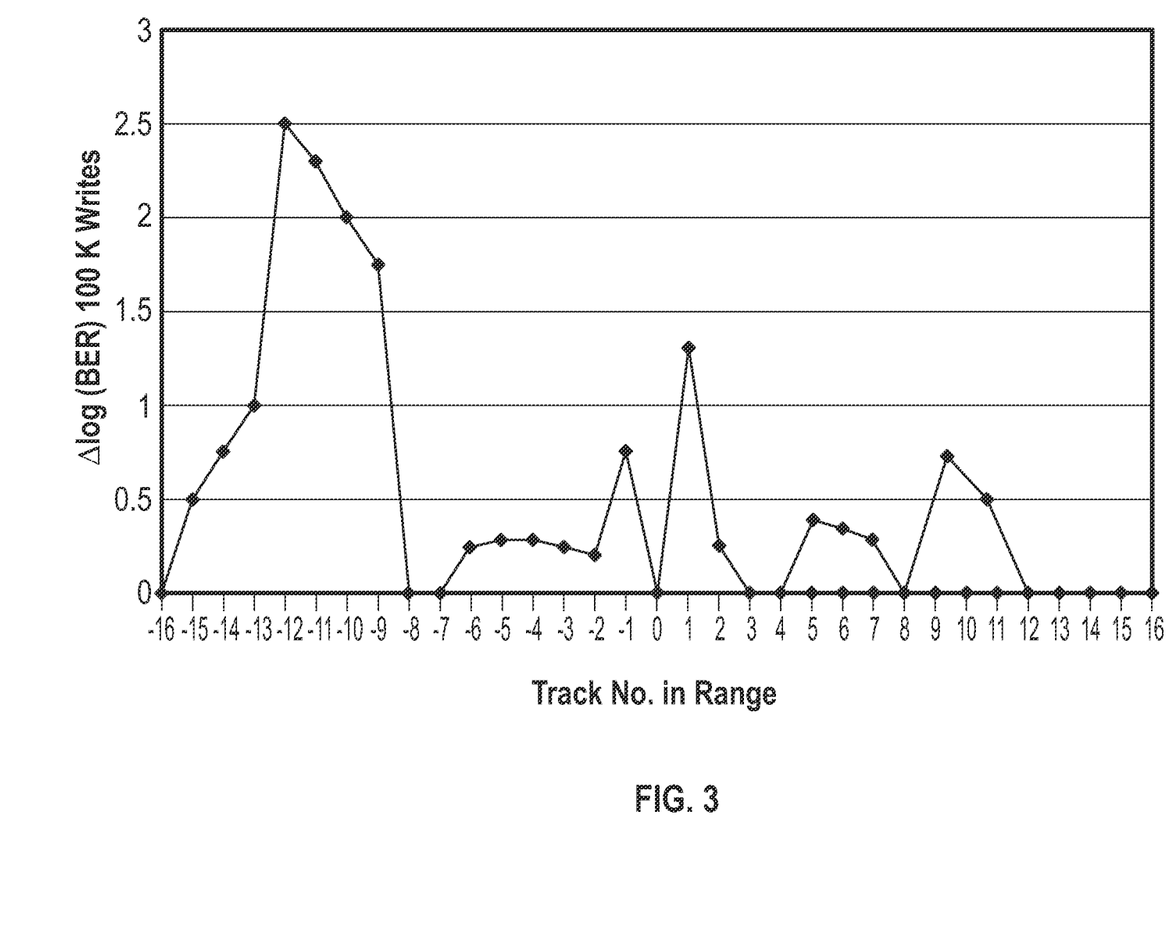
FIG. 3 is a graph of an example of measured bit error rate (BER) degradation values for a range of tracks written by a perpendicular recording head and illustrates the effect of far track erasure (FTE).

In one approach for determining the relative FTE effects on the tracks within a range of tracks of the track being written, the error rate is used to determine the count increments. A predetermined data pattern is written to all the tracks within a range of tracks from a track (designated track 0). An initial "bit" error rate (BER) is then measured for each track in the range of tracks. In one well-known approach for measuring BER, the HDD's error correction circuitry is deactivated, for example by setting to zero the value in the error correction register for the maximum number of errors to correct, and then the data pattern is read back and the number of bytes in error is counted. Since there must be at least one bit in error for each byte in error, this is the initial BER for each track in the range. Then track 0 is written a very large number of times (for example 100,000 writes). The BER is then again measured for all tracks in the range. The degradation in BER is the difference between the measured BER after the writes to track 0 and the initial BER. FIG. 3 is a graph of measured BER degradation values for a range of 32 shingled data tracks (tracks −1 to −16 to one side of the write head and tracks +1 to +16 on the other side of the write head) written by a perpendicular write head. The y-axis of FIG. 3 is the difference in the logarithm of the measured BER after writes and the logarithm of the initial BER ($\Delta$ log (BER)). This graph shows the expected relatively large effect of the fringe fields at immediately adjacent tracks −1 and +1. The FTE effect is clearly shown by the high BER values for tracks −9 to −15, which are significantly higher than the BER values for tracks closer to track 0 (tracks −2 to −8). FIG. 3 also shows the unsymmetrical characteristic of FTE effect, with very low BER values for tracks between +12 and +16. The range of the FTE to a side of the head is thus a variable N, depending on the particular head, and the value of N on one side of the head can be different from the value of N on the other side. In the example of FIG. 3, N is 12 on the plus side (for example the OD side) and 16 on the minus side (the ID side).

In the previously cited '177 and '178 applications, assigned to the same assignee as this invention, a counter is maintained for each data band and when data is written to the boundary region of a band or to an IBC, the counters associated with adjacent bands are incremented by a value related to the previously measured BER degradation values. When the count for a band reaches a predetermined threshold, the data in that band is rewritten. The data is rewritten before the FTE effects can build up, so the reliability of the data is improved.

In certain host computer applications the workload can become very localized on certain areas of the disk, i.e., the heads can be reading and writing to the same data bands, which can be considered "hot" data bands. This means that if the method for compensating for FTE effects is to refresh data bands adjacent to a hot data band, there will be excessive read/write activity required to continually refresh these data bands, which will adversely affect the performance of the disk drive.

In this invention, for every writing to a band (or to an IBC if the disk drive uses IBCs), a counter is incremented. When the count reaches a predetermined value, the data is read from the tracks that are within the FTE range in adjacent bands and written to the E-cache. Those tracks in the adjacent bands are then invalidated, i.e., they are no longer assigned as PBAs to LBAs. The method of the invention will be explained with FIGS. 4A-4B.

Figure 4A:
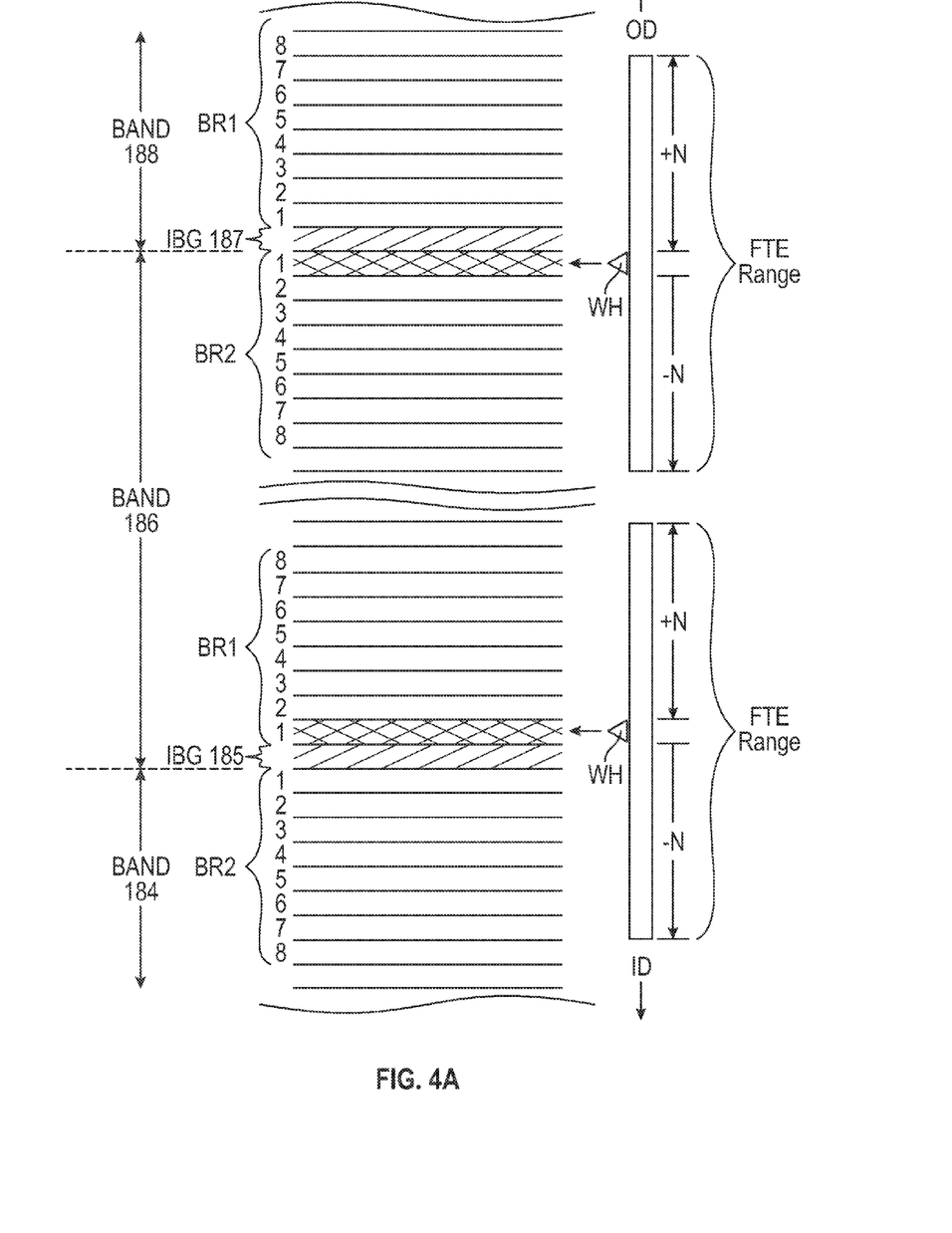
FIG. 4A is a schematic representation of a SMR disk showing three annular bands with inter-band gaps and band boundary regions and illustrating the write head and its far track erasure (FTE) range.

In FIG. 4A, three annular bands 184, 186, 188 are depicted, with one-track wide inter-band gaps (IBGs) 185, 187. Each band has 2 boundary regions, BR1 at the ID side and BR2 at the OD side. In the example of FIG. 4A, band 186 is being written, so the write head (WH) is depicted first as being aligned to the right of track 1 in boundary region BR1 of band 186. In this example, the effect of FTE is from −8 tracks to +8 tracks, so the variable N is +8 on the OD side and −8 on the ID side, a relatively small number for ease of illustration. However, the FTE can be asymmetrical, in which case the value of the variable N on the OD side will be different from the value on the ID side. As shown in the lower portion of FIG. 4A, the range of −N tracks from the track being written (track 1 in BR1 of band 186) extends only into tracks 1 through 7 in the adjacent boundary region, i.e. BR2 of band 184. This is because the IBG 185 has a track width of 1 track. However, the IBG may have a width of M tracks, so that the number of tracks in an adjacent band that would be exposed to FTE would be N−M. After writing to track 1 in BR1 of band 186, the WH then writes all the tracks in band 186 succession in the direction of ID to OD, including the last track in the band, i.e., track 1 in BR2. As shown in the upper portion of FIG. 4A, the range of +N tracks from the track being written (track 1 in BR2 of band 186) extends only into tracks 1 through 7 in the adjacent boundary region, i.e. BR1 of band 188.

Each time band 186 is written, i.e., de-fragmented or refreshed, a counter is incremented. When a predetermined threshold is reached, indicating that band 186 is a "hot" band, the data from tracks affected by FTE in the two adjacent bands, i.e., tracks 1-7 in BR2 of band 184 and tracks 1-7 in BR1 of band 188, is read and written to the E-cache. Those tracks are then invalidated, meaning that they are no longer used as PBAs.

Figure 4B:
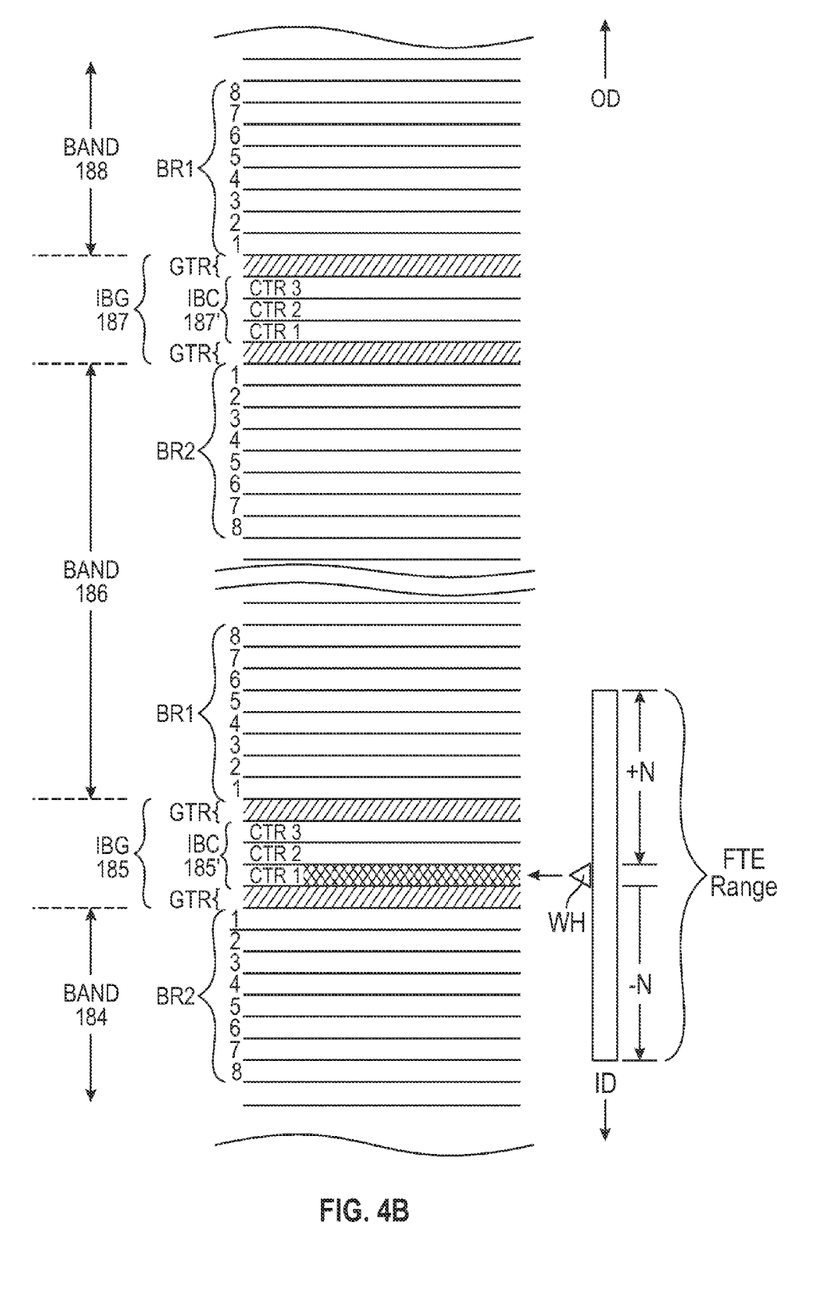
FIG. 4B is a schematic representation of a SMR disk showing three annular bands with inter-band gaps having inter-band cache (IBC) tracks and band boundary regions and illustrating the write head and its far track erasure (FTE) range.

The method may also be used for a SMR disk drive that uses on-disk inter-band caches (IBCs). In FIG. 4B, portions of three annular bands 184, 186, 188 are depicted, with five-track wide (IBGs) 185, 187. Each band has 2 boundary regions, BR1 at the ID side and BR2 at the OD side. Each IBG has an on-disk inter-band cache (IBC) made up of three cache tracks (CTRs) and two guard tracks (GTRs), one on each side of the IBC. Each GTR separates the IBC from an adjacent data band. Writing to the CTRs in IBC 185' will have a FTE effect on both BR2 of band 184 and BR1 of band 186. As shown in FIG. 4B, the WH is aligned with CTR1 and has a FTE range of −N tracks, but the FTE extends only into tracks 1 through 7 in the adjacent boundary region, i.e., BR2 of band 184, because of the single GTR between IBC 185' and track 1 of BR2 of band 184. However, the IBG 185 may have more than one GTR, for example P GTRs, between the IBC 185' and the adjacent boundary regions, so that the number of tracks in an adjacent band that would be exposed to the FTE would be N—P. The WH then writes all the tracks CTR1, CTR2, CTR3 in IBC 185' in the direction of ID to OD. When the WH is aligned with CTR3, the FTE extends only into tracks 1 through 7 in the adjacent boundary region, i.e. BR1 of band 186.

Each time IBC 185' is written, a counter is incremented. When a predetermined threshold is reached, indicating that IBC 185' is a "hot" IBC, the data from tracks affected by FTE in the two adjacent bands, i.e., tracks 1-7 in BR2 of band 184 and tracks 1-7 in BR1 of band 186, is read and written to the E-cache. Those tracks are then invalidated, meaning that they are no longer used as PBAs.

During operation of the HDD, the controller (HDC 12 in FIG. 1), or another controller or microprocessor in the HDD, identifies the bands and IBCs where data is being written and increments a counter for that band or IBC. When the count value for a band or IBC reaches a predetermined threshold (T) the data is read from tracks within the FTE range in adjacent bands and rewritten to the E-cache, after which the controller marks those tracks as invalid PBAs. The threshold T is typically a predetermined count within a predetermined time period. The value for T can be chosen based on several factors, including the known track density of the HDD, the intended purpose of the HDD, the desired reliability, and the BER of the HDD measured during manufacturing. Thus, depending on these factors, T may be chosen to be a relatively high value, for example higher than 1000, or a relatively low value, for example less than 10, within a time period 10 minutes. The method may also include the ability for the controller to re-validate the previously invalidated tracks if the count/time-period falls below a predetermined threshold Q, (where Q is less than T), thereby indicating that a previously "hot" data band or IBC is now "cold".

Figure 5:
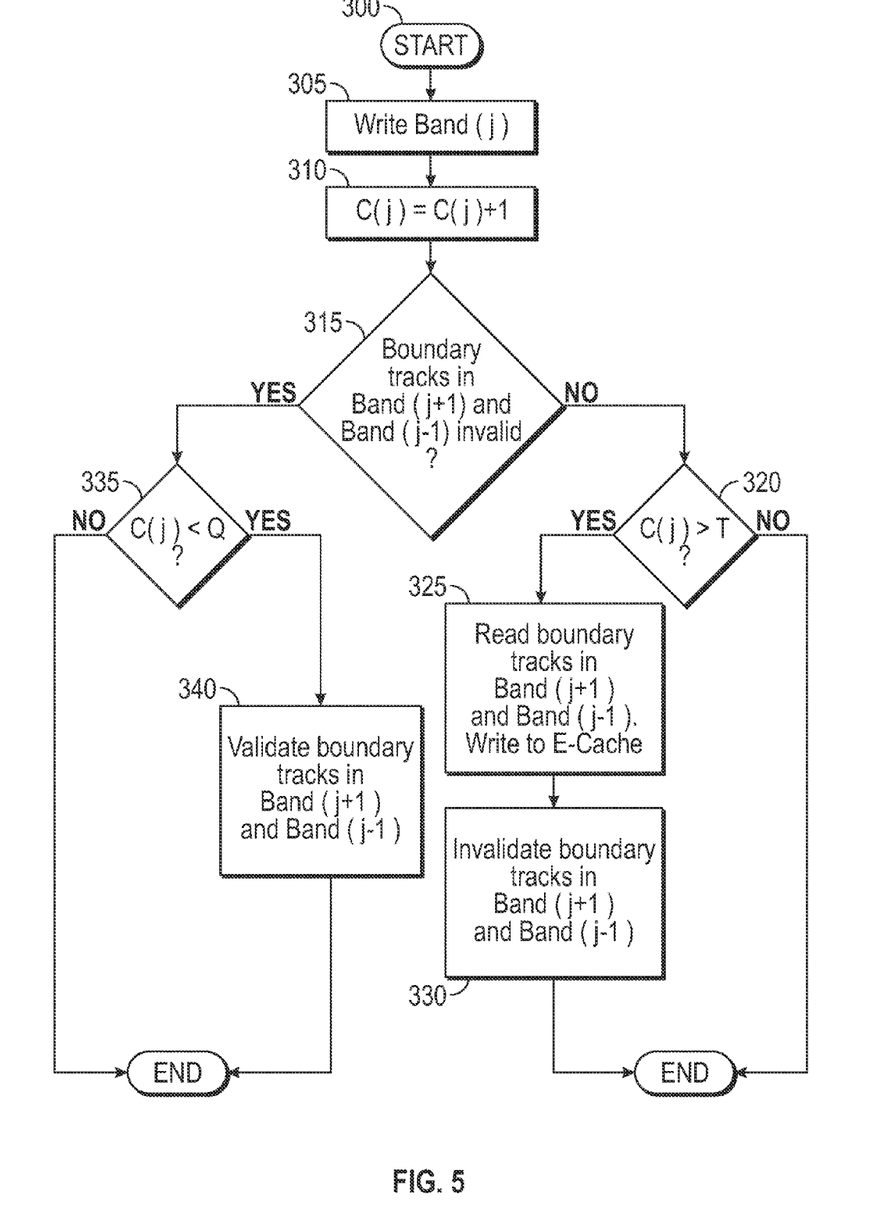
FIG. 5 is a flow chart illustrating the method of the invention as applied to writing to one data band.

FIG. 5 is a flow chart for illustrating the method as applied to writing to one data band. At the start (block 300), data is written to a data band, i.e. band(j) (block 305), typically during a refresh or de-fragmentation process that writes to all the tracks in band(j). After the data has been written, a counter C(j) is incremented (block 310). Next, it is determined if boundary tracks in adjacent bands, i.e., band (j−1) and band (j+1), are already invalidated (block 315). If not (NO at block 315), then the count C(j) is tested against the threshold T (block 320). If the count exceeds the threshold (YES at block 320), then data is read from the boundary tracks in band(j−1) and band(j+1) (block 325) and written to the E-cache (block 330). Those tracks are then invalidated, i.e., marked as no longer capable of being assigned as PBAs (block 330) and the method ends. If the count does not exceed the threshold T (NO at block 320), the method ends. Referring back to block 315, if tracks in band (j+1) and band (j−1) are already invalidated (YES at block 315) then the count C(j) is tested against the lower threshold Q (block 335). If C(j) is less than Q (YES at block 335), this means that band(j) is no longer "hot", and the previously invalidated boundary tracks in band(j+1) and band(j−1) are validated, i.e., marked as again capable of being assigned as PBAs (block 340), and the method ends. If the count is not less than the threshold Q (NO at block 335), the method ends.

Because a HDD typically includes multiple disk surfaces, each with an associated read/write head, and because not all heads will have the same exact write profiles and thus not generate the same FTE effects, the FTE range, that is the values of +N and −N, may be different for each head and its associated disk surface. Also, because of head skew, the write profile and thus the FTE effect for a particular head may vary depending on the radial position of the head, so a head may have a set of N values. Thus a table may be maintained in memory that includes the values of N, or sets of values of N, for each head.

The operation of the HDD as described above may be implemented as a set of computer program instructions stored in memory and executable by a processor, such as the HDC, or a separate controller or microprocessor in the HDD. The controller performs logical and arithmetic operations based on the program instructions stored in memory, and is thus capable of performing the functions described above and represented in the figures.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A shingled magnetic recording disk drive comprising:
a magnetic recording disk having a recording surface with a plurality of concentric shingled data tracks arranged in annular bands separated by annular inter-band gaps, each band having a boundary region of tracks adjacent a gap, whereby each gap is located between adjacent boundary regions, the recording surface also having an extended cache region comprising a plurality of concentric data tracks separated from the data bands;
a write head associated with said disk surface for generating a magnetic write field to write data to the tracks;
a read head for reading data written in the tracks;
a controller for controlling the writing of data by the write head to the tracks; and
memory coupled to the controller and containing a program of instructions readable by the controller for minimizing the effect of encroachment of the write field on tracks in a band when data is being written outside the band, the program of instructions undertaking the method acts comprising:
(a) maintaining in memory a count for each band;
(b) for each writing of data to a band, incrementing the count for that band; and
(c) when a count reaches a predetermined threshold for a band, reading the data from the tracks in the boundary region of an adjacent band;
(d) writing the data read from the tracks in the boundary region of said adjacent band to the extended cache region; and
(e) invalidating the tracks in the boundary region of said adjacent band from which the data was read.

2. The disk drive of claim 1 wherein a band has an inside-diameter (ID) adjacent band and an outside-diameter (OD) adjacent band, and wherein the program of instructions comprises undertaking method acts (c) through (e) for the boundary region of the ID adjacent band and the boundary region of the OD adjacent band.

3. The disk drive of claim 1 wherein the effect of encroachment of the write field on data tracks is within a range of N tracks, wherein act (c) comprises reading N or fewer tracks, and wherein act (e) comprises invalidating N or fewer tracks.

4. The disk drive of claim 3 wherein the inter-band gap consists of M tracks, wherein act (c) comprises reading N–M tracks, and wherein act (e) comprises invalidating N–M tracks.

5. The disk drive of claim 1 wherein the controller assigns physical block addresses (PBAs) to logical block addresses (LBA) for blocks of data to be written, and wherein invalidating said tracks comprises preventing the assignment of PBAs associated with said tracks.

6. The disk drive of claim 1 wherein said predetermined threshold comprises a predetermined number within a predetermined time period.

7. The disk drive of claim 1 wherein a plurality of inter-band gaps each contains at least one writable inter-band cache (IBC) track and wherein the method acts further comprise:
(f) maintaining in memory a count for each IBC;
(g) for each writing of data to an IBC, incrementing the count for that IBC; and
(h) when a count reaches a predetermined threshold for an IBC, reading the data from the tracks in the boundary region of a band adjacent to said IBC;
(i) writing the data read from the tracks in the boundary region of said adjacent band to the extended cache region; and
(j) invalidating the tracks in the boundary region of said adjacent band from which the data was read.

8. The disk drive of claim 7 wherein an IBC has an inside-diameter (ID) adjacent band and an outside-diameter (OD) adjacent band, and wherein the program of instructions comprises undertaking method acts (h) through (j) for the boundary region of the ID adjacent band and the boundary region of the OD adjacent band.

9. The disk drive of claim 7 wherein the effect of encroachment of the write field on data tracks is within a range of N tracks, wherein act (h) comprises reading N or fewer tracks, and wherein act (j) comprises invalidating N or fewer tracks.

10. The disk drive of claim 9 wherein each inter-band gap includes P guard tracks between the IBC and the boundary of an adjacent band, wherein act (h) comprises reading N–P tracks, and wherein act (i) comprises invalidating N–P tracks.

11. The disk drive of claim 7 wherein said predetermined threshold comprises a predetermined number within a predetermined time period.

12. The disk drive of claim 1 wherein the disk drive has a plurality of disk surfaces, each having a plurality of concentric data tracks, and associated write heads, and wherein the program of instructions comprises undertaking method acts (a) through (c) for each disk surface.

13. The disk drive of claim 1 wherein the memory is nonvolatile memory.

14. A shingled magnetic recording disk drive comprising:
a magnetic recording disk having a recording surface with a plurality of concentric shingled data tracks having data sectors with physical block addresses (PBAs), the tracks being arranged in annular bands separated by annular inter-band gaps, each band having a boundary region of tracks adjacent a gap, whereby each gap is located between adjacent boundary regions, the recording surface also having an extended cache region comprising a plurality of concentric data tracks separated from the data bands;
a write head associated with said disk surface for generating a magnetic write field to write data to the tracks;
a read head for reading data written in the tracks;
a controller for assigning physical block addresses (PBAs) to logical block addresses (LBAs) for blocks of data to be written to the data sectors by the write head; and
memory coupled to the controller and containing a program of instructions readable by the controller for minimizing the effect of encroachment of the write field on tracks in a band when data is being written outside the band, the program of instructions undertaking the method acts comprising:
(a) maintaining in memory a count for each band;
(b) for each writing of data to a band, incrementing the count for that band; and
(c) when a count reaches a predetermined number within a predetermined time period for a band, reading the data from the tracks in the boundary region of an adjacent band;
(d) writing the data read from the tracks in the boundary region of said adjacent band to the extended cache region; and
(e) preventing the assignment of PBAs to the data sectors in the tracks in the boundary region of said adjacent band from which the data was read.

15. The disk drive of claim 14 wherein a band has an inside-diameter (ID) adjacent band and an outside-diameter (OD) adjacent band, and wherein the program of instructions comprises undertaking method acts (c) through (e) for the boundary region of the ID adjacent band and the boundary region of the OD adjacent band.

16. The disk drive of claim 14 wherein the effect of encroachment of the write field on data tracks is within a range of N tracks, wherein act (c) comprises reading N or fewer tracks, and wherein act (e) comprises preventing the assignment of PBAs in N or fewer tracks.

17. The disk drive of claim 16 wherein the inter-band gap consists of M tracks, wherein act (c) comprises reading N−M tracks, and wherein act (e) comprise preventing the assignment of PBAs in N−M tracks.

18. A shingled magnetic recording disk drive comprising:
a magnetic recording disk having a recording surface with a plurality of concentric shingled data tracks arranged in annular bands separated by annular inter-band gaps, each band having a boundary region of tracks adjacent a gap whereby each gap is located between adjacent boundary regions, and wherein a plurality of inter-band gaps each contains at least one writable inter-band cache (IBC), the recording surface also having an extended cache region comprising a plurality of concentric data tracks separated from the data bands;
a write head associated with said disk surface for generating a magnetic write field to write data to the tracks;
a read head for reading data written in the tracks;
a controller for controlling the writing of data by the write head to the tracks; and
memory coupled to the controller and containing a program of instructions readable by the controller for minimizing the effect of encroachment of the write field on tracks in a band when data is being written to an IBC, the program of instructions undertaking the method acts comprising:
(a) maintaining in memory a count for each IBC;
(b) for each writing of data to an IBC, incrementing the count for that IBC; and
(c) when a count reaches a predetermined threshold for an IBC, reading the data from the tracks in the boundary region of a band adjacent to said IBC;
(d) writing the data read from the tracks in the boundary region of said adjacent band to the extended cache region; and
(e) invalidating the tracks in the boundary region of said adjacent band from which the data was read.

19. The disk drive of claim 18 wherein said predetermined threshold comprises a predetermined number within a predetermined time period.

* * * * *